United States Patent
Wiggins et al.

(10) Patent No.: US 9,075,498 B1
(45) Date of Patent: Jul. 7, 2015

(54) USER INTERFACE FOR FINDING SIMILAR DOCUMENTS

(75) Inventors: Nelson Murray Wiggins, San Jose, CA (US); Karen Williams, Sunnyvale, CA (US); Gary Steven Lehrman, Cupertino, CA (US); Kurt Leafstrand, Saratoga, CA (US)

(73) Assignee: Symantec Corporation, Mountain View, CA (US)

( * ) Notice: Subject to any disclaimer, the term of this patent is extended or adjusted under 35 U.S.C. 154(b) by 34 days.

(21) Appl. No.: 13/335,809

(22) Filed: Dec. 22, 2011

(51) Int. Cl.
*G06F 3/0481* (2013.01)
*G06F 17/30* (2006.01)

(52) U.S. Cl.
CPC ........ *G06F 3/0481* (2013.01); *G06F 17/30687* (2013.01)

(58) Field of Classification Search
CPC .......................... G06F 17/30687; G06F 3/0481
USPC .................................................. 715/763, 810
See application file for complete search history.

(56) References Cited

U.S. PATENT DOCUMENTS

| | | | |
|---|---|---|---|
| 5,598,557 A * | 1/1997 | Doner et al. ........................ | 1/1 |
| 6,671,683 B2 * | 12/2003 | Kanno ................................ | 1/1 |
| 7,461,059 B2 | 12/2008 | Richardson et al. | |
| 7,743,051 B1 | 6/2010 | Kashyap et al. | |
| 7,752,243 B2 | 7/2010 | Hoeber et al. | |
| 8,392,409 B1 | 3/2013 | Kashyap et al. | |
| 2004/0199555 A1 * | 10/2004 | Krachman ..................... | 707/204 |
| 2005/0246328 A1 * | 11/2005 | Zhang et al. ..................... | 707/3 |
| 2008/0140649 A1 | 6/2008 | Williams | |
| 2010/0030798 A1 | 2/2010 | Kumar et al. | |
| 2011/0113042 A1 * | 5/2011 | Green et al. .................. | 707/749 |
| 2011/0225155 A1 | 9/2011 | Roulland et al. | |
| 2011/0320453 A1 * | 12/2011 | Gallivan et al. ............... | 707/738 |
| 2012/0158728 A1 | 6/2012 | Kumar et al. | |
| 2013/0013612 A1 * | 1/2013 | Fittges et al. ................. | 707/739 |

OTHER PUBLICATIONS

U.S. Appl. No. 13/474,602, filed May 17, 2012.
U.S. Appl. No. 13/351,992, filed Dec. 22, 2011.
U.S. Appl. No. 13/324,903, filed Jan. 17, 2012.

* cited by examiner

*Primary Examiner* — Omar Abdul-Ali
*Assistant Examiner* — Mong-Shune Chung
(74) *Attorney, Agent, or Firm* — Lowenstein Sandler LLP

(57) ABSTRACT

A computing device determines counts of documents that are similar to a reference document for a set of similarity ratings. Each similarity rating is based on a number of co-occurring terms between the reference document and corresponding similar documents. The computing device present the reference document and a GUI element pertaining to the documents similar to the reference document in a graphical user interface (GUI). Upon a selection of the GUI element, the computing device presents a visual representation of a correlation between the counts of similar documents and the similarity ratings in the GUI. The visual representation is provided prior to displaying at least one of the similar documents.

20 Claims, 8 Drawing Sheets

USER INTERFACE FOR FINDING SIMILAR DOCUMENTS

TECHNICAL FIELD

Embodiments of the present invention relate to reviewing search results, and more particularly, to a technique of providing a user interface for finding similar documents.

BACKGROUND

Reviewers that review search results, for example, during electronic discovery (e-discovery), may wish to review similar documents at the same time, for example, during the same review session. Reviewing similar documents may help reviewers in being consistent, for example, when tagging documents during the review. A complaint among some reviewers that wish to find documents that are similar to a certain document is the time and effort it takes to select a threshold of similarity. Currently, some reviewers determine the level of similarity by manually setting a similarity rating threshold and running a search to determine how many documents meet the particular similarity rating threshold. For example, a user may first set a high threshold (e.g., 90), run a search, and determine that there are only 3 similar documents, which may be too few. The user conducts a manual recursive process, by trial and error, until the user finds a threshold that returns a reasonable number of documents. For example, the user may next set a low threshold (e.g., 10), run the search, and determine that there are 3000 similar documents, which may be too many. The manual process of running a search for the various thresholds to determine an appropriate similarity rating threshold is typically an inefficient and slow process.

SUMMARY

An exemplary system may include a memory and a processing device that is coupled to the memory. In one embodiment, the system determines counts of documents similar to a reference document for a set of similarity ratings. Each similarity rating is based on a number of co-occurring terms between the reference document and corresponding similar documents. The system presents the reference document and a GUI element pertaining to the documents similar to the reference document in a graphical user interface (GUI). Upon a selection of the GUI element, the system presents a visual representation of a correlation between the counts of similar documents and the similarity ratings in the GUI. The visual representation is provided prior to displaying at least one of the similar documents.

In one embodiment, the GUI includes a GUI element to receive input of a user-specified similarity rating threshold, which can be used to display at least one of the similar documents. In one embodiment, the system presents a number representing the similar documents having a similarity rating matching a default similarity rating threshold in the GUI. In one embodiment, the system receives input via the GUI of a user-specified similarity rating threshold and presents a number representing the similar documents having a similarity rating matching the user-specified similarity rating threshold in the GUI.

In one embodiment, the system receives user input via the GUI to retrieve similar documents having a similarity rating matching a similarity rating threshold. The similarity rating threshold is a default similarity rating threshold or a user-specified similarity rating threshold. The system then displays the similar documents having a similarity rating matching the similarity rating threshold.

In one embodiment, the visual representation is a histogram of the counts of the similar documents for the set of similarity ratings. In one embodiment, the visual representation is a cumulative histogram.

In one embodiment, the system determines a similarity rating for documents in the collected data by comparing a document feature vector of the reference document to a document feature vector of the documents in the collected data, and for each similarity rating, determines a number of documents having the corresponding similarity rating.

In additional embodiments, methods for performing the operations of the above described embodiments are also implemented. Additionally, in embodiments of the present invention, a non-transitory computer readable storage medium stores methods for performing the operations of the above described embodiments.

BRIEF DESCRIPTION OF THE DRAWINGS

Various embodiments of the present invention will be understood more fully from the detailed description given below and from the accompanying drawings of various embodiments of the invention.

DETAILED DESCRIPTION

Embodiments of the invention are directed to a method and system for providing a visual representation of the number of documents that are similar to a reference document for a set of similarity ratings. A user that is conducting a review of search results, for example, for electronic discovery (e-discovery), may review a set of documents in the search results using a graphical user interface (GUI). The user may start from a given document (reference document) and may wish to find documents that are similar to the reference document. A user may find it more convenient to review similar documents at the same time. For instance, reviewing similar documents together can accelerate the review process and ensure greater tag consistency. Prior to retrieving any similar document, a computing device can determine counts of similar documents in collected data that are similar to the reference document for a set of similarity ratings and present in a graphical user interface (GUI) the reference document and a GUI element pertaining to the documents similar to the reference document. Upon selection of the GUI element, the computing device can present a visual representation of a correlation between the counts of similar documents and the similarity ratings in the GUI. The visual representation is provided prior to displaying at least one of the similar documents. The visual representation can be a histogram showing how many documents are considered similar at any given similarity rating, for example, in a scale of 0 to 100.

The GUI can include a GUI element to receive input of a user-specified similarity rating threshold. The GUI element allows the computing device to retrieve and display documents based on the user-specified similarity rating threshold. A user can view the histogram data to determine which similarity rating threshold to specify. For instance, the user may see from the histogram that there are 1500 documents that have a similarity rating of 20 and above and that there are 1000 documents that have a similarity rating of 65 and above. Based on the histogram data, the user may wish to retrieve documents that have a similarity rating of 65 and above. A user may click on a user interface element in the GUI to find documents that are similar to the reference document based a similarity rating of 65 and above. The computing device may then run a search, which will return those documents which are considered similar based on the user-specified similarity rating.

Embodiments provide users with a more efficient and a controllable review session by allowing users to see at a glance how many documents are similar to a particular document at any given similarity rating. Embodiments provide a visual representation prior to running a search to make the review session easier for users to find what they are looking for, be it a small amount of very similar documents, a high amount of vaguely similar documents, or any threshold in between.

Figure 1:
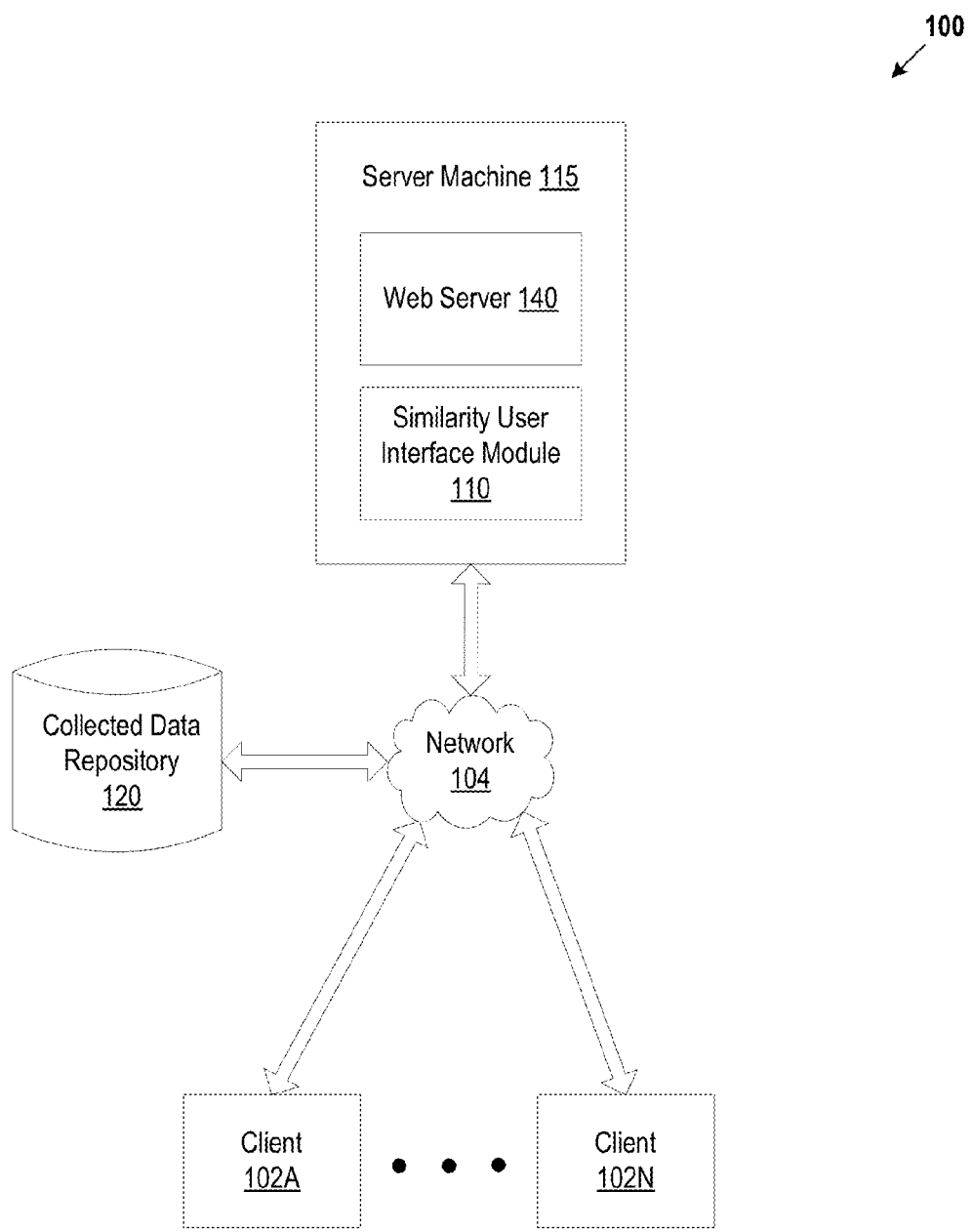
FIG. 1 illustrates exemplary system architecture, in accordance with various embodiments of the present invention.

FIG. 1 illustrates exemplary system architecture 100 in which embodiments can be implemented. The system architecture 100 includes a server machine 115, a collected data repository 120 and client machines 102A-102N connected to a network 104. Network 104 may be a public network (e.g., the Internet), a private network (e.g., a local area network (LAN) or wide area network (WAN)), or a combination thereof.

Collected data repository 120 is a persistent storage that is capable of storing data that is collected from data sources. Examples of data sources can include, and are not limited to, desktop computers, laptop computers, handheld computers, server computers, gateway computers, mobile communications devices, cell phones, smart phones, or similar computing device. As will be appreciated by those skilled in the art, in some embodiments collected data repository 120 might be a network-attached file server, while in other embodiments collected data repository 120 might be some other type of persistent storage such as an object-oriented database, a relational database, and so forth.

The data in the collected data repository 120 can include data items. Examples of data items can include, and are not limited to, email messages, instant messages, text messages, voicemail messages, documents, database content, CAD/CAM files, web sites, loose files, archives, PST (personal storage table) files, container files, zip files, and any other electronically stored information that can be used for e-discovery. For brevity and simplicity, a document is used as an example of a data item in the collected data repository 120 throughout this document.

The client machines 102A-102N may be personal computers (PC), laptops, mobile phones, tablet computers, or any other computing devices. The client machines 102A-102N may run an operating system (OS) that manages hardware and software of the client machines 102A-102N. A browser (not shown) may run on the client machines (e.g., on the OS of the client machines). The browser may be a web browser that can access content served by a web server. The browser may issue data search queries to the web server or may browse collected data that have previously been processed (e.g., indexed, classified, ranked). The client machines 102A-102N may also upload collected data to the web server for storage and/or classification.

Server machine 115 may be a rackmount server, a router computer, a personal computer, a portable digital assistant, a mobile phone, a laptop computer, a tablet computer, a camera, a video camera, a netbook, a desktop computer, a media center, or any combination of the above. In one embodiment, server machine 115 is deployed as a network appliance (e.g., a network router, hub, or managed switch). Server machine 115 includes a web server 140 and a similarity user interface module 110. In alternative embodiments, the web server 140 and similarity user interface module 110 may run on different machines.

Web server 140 may serve data from collected data repository 120 to clients 102A-102N. Web server 140 may receive data queries and perform searches on the collected data in the collected data repository 120 to find data that satisfies the data query. A data query may be, for example, an e-discovery query for documents that have similar terms, a search of the collected data based on parameters that can include, and are not limited to, keyword, date range, custodian, location of data, data type, languages, tags in folders, properties of a data item (e.g., email properties), etc. Web server 140 may then send to a client 102A-102N those data (e.g., documents) that match the search query. In one embodiment, web server 140 provides an application that manages the collected data. For example, the application can be a document review application for e-discovery. In one embodiment, an application is provided by and maintained within a service provider environment and provides services relating to the collected data. For example, a service provider maintains web servers 140 to provide document review services for e-discovery.

In order for the collected data repository 120 to be searchable, the data items in the collected data repository 120 may be assigned a similarity rating. A similarity rating is a score that represents how similar a document is to a reference document based on co-occurring terms. A co-occurring term is a term that occurs in both a reference document and a document that is being rated in the collected data repository 120. A low similarity rating can indicate few co-occurring terms between the reference document and the document being rated. A high similarity rating can indicate many co-occurring terms between the reference document and the document being rated. In one embodiment, similarity user interface module 110 computes a similarity rating for each of the data items in the collected data repository 120.

The collected data may then be searched based on the similarity ratings. The similarity user interface module 110 can use the similarity ratings to provide a visual representation of the number of documents that are similar to a reference document for a set of similarity ratings prior to running any document search. The similarity user interface module 110 can create a histogram of the counts of the similar documents across the set of similarity ratings as the visual representation. A web server 140 can access the histogram to provide a service related to the collected data, such as a document review service.

Figure 2:
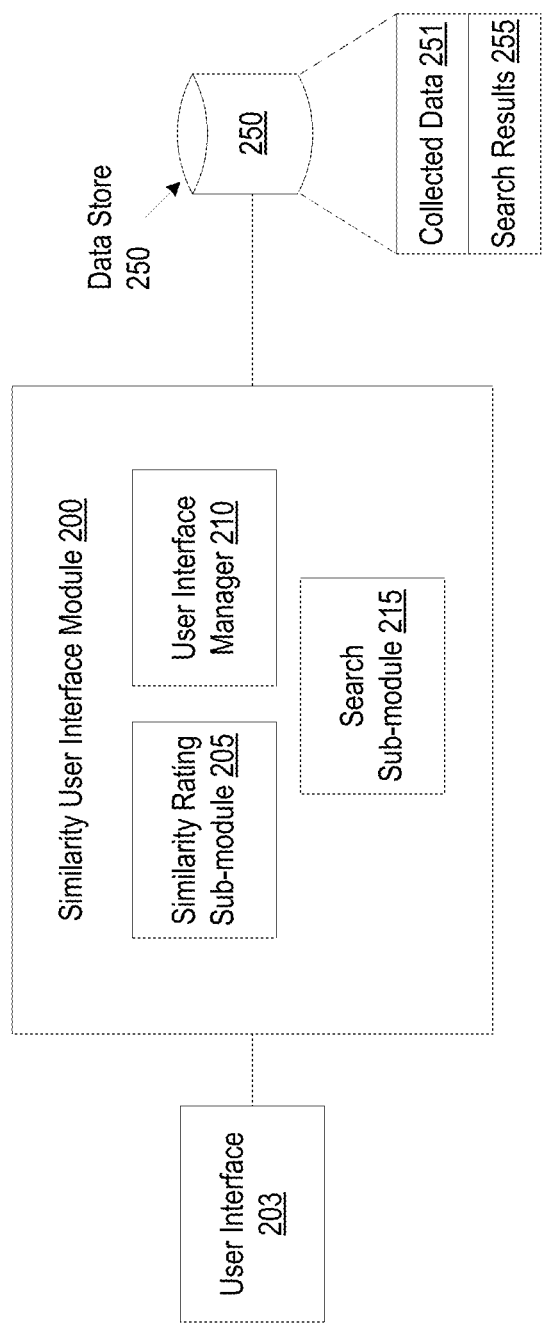
FIG. 2 is a block diagram of a similarity user interface module, in accordance with an embodiment.

FIG. 2 is a block diagram of a similarity user interface module 200, in accordance with one embodiment of the present invention. The similarity user interface module 200 includes a similarity rating sub-module 205, a UI generator 210, and a search sub-module 215. Note that in alternative embodiments, the functionality of one or more of the similarity rating sub-module 205, the UI generator 210, and the search sub-module 215 may be combined or divided.

The similarity rating sub-module 205 can be coupled to a data store 250 that stores collected data 251 collected from various data sources. The collected data 251 can be stored as one or more relational databases, spreadsheets, flat files, etc. A data store 250 can be a persistent storage unit. A persistent storage unit can be a local storage unit or a remote storage unit. Persistent storage units can be a magnetic storage unit, optical storage unit, solid state storage unit, electronic storage units (main memory), or similar storage unit. Persistent storage units can be a monolithic device or a distributed set of devices. A 'set', as used herein, refers to any positive whole number of items.

The similarity rating sub-module 205 can determine a similarity rating for the documents in the collected data 251. The similarity rating sub-module 205 can generate document feature vectors for the documents (e.g., documents in the collected data 251). A document feature vector is can be a representation of terms in a document. The similarity rating sub-module 205 can use the document feature vectors to determine the similarity rating for the documents. One embodiment of determining a similarity rating for the documents is described in greater detail below in conjunction with FIG. 5. In one embodiment the similarity ratings are in a range of 0-100. In another embodiment the similarity ratings are in a range of 0-1. The similarity rating sub-module 205 can determine, for each similarity rating, a number of collected documents that have the corresponding similarity rating. For example, for a set of similarity ratings in a range of 0-100, processing logic determines that there are 0 documents that have a similarity rating of 100, 700 documents that have a similarity rating of 85, 1000 documents that have a similarity rating of 65, and 1500 documents that have a similarity rating of 20, etc. for each similarity rating.

The UI generator 210 can generate a visual representation of the counts of the similar documents, with respect to a reference document, for a set of similarity ratings (e.g., similarity rating from 0-100). In one embodiment, the visual representation is a histogram of the counts of the similar documents across the set of similarity ratings. In one embodiment, the histogram is a cumulative histogram.

The UI generator 210 can generate and provide a user interface (UI) 203 that includes the visual representation (e.g., histogram). The UI 203 can be a graphical user interface (GUI). The UI 203 can be a web-based GUI. In one embodiment, the UI generator 210 configures the UI 203 with a default similarity rating threshold and initially presents visual indicators (e.g., number, sliding bar, text box, etc.) that correspond to the default similarity rating threshold in the UI 203. A similarity rating threshold can represent a minimum similarity rating for which the similarity user interface module 200 is to use to define whether documents are similar. For example, two emails, attachments, or loose files are considered similar if the number of co-occurring terms exceeds a similarity rating threshold. For example, a user wishes to see the documents that have a similarity rating of 65 or more. One embodiment of a UI 203 that includes a visual representation of the counts of the similar documents and documents that are not similar based on a similarity rating threshold for a set of similarity ratings is described in greater detail below in conjunction with FIG. 4.

The UI generator 210 can receive user input via the UI 203 of a user-specified similarity rating threshold. For example, UI 203 may be initially configured for a default similarity rating threshold of 65. In one example, the user may move a slider bar in the UI 203 to set a similarity rating threshold to 20. In another example, a user may enter a similarity rating threshold of 20 in an input field in the UI 203. The UI generator 210 can update visual indicators (e.g., number, sliding bar, text box, etc.) in the UI 203 to represent the similar documents that have a similarity rating that matches the user-specified similarity rating threshold.

The UI generator 210 can receive user input via the UI 203 to retrieve the similar documents based on the user-specified or default similarity rating threshold. The search sub-module 215 can search for the similar documents in the collected data 251 and provide the similar documents to the user via a GUI (e.g., UI 203 or another GUI). For example, the search sub-module 215 can identify the user-specified similarity rating threshold parameter of 20 and can search the collected data 251 for documents that have a similarity rating of 20 or more. For instance, the search sub-module 215 identifies 1500 documents. The search sub-module 215 can store the search results 255 from the search in the data store 250.

Figure 3:
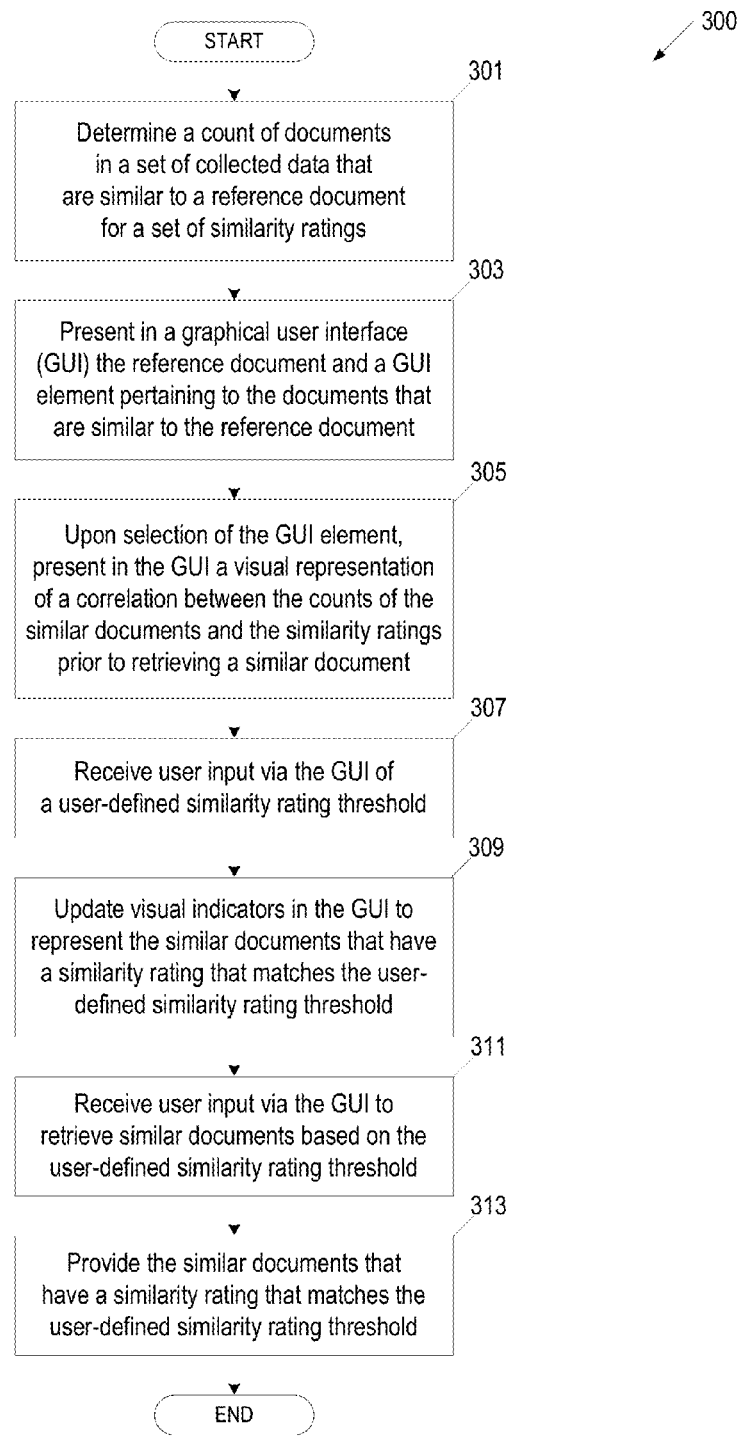
FIG. 3 is a flow diagram illustrating an embodiment for a method of providing a visual representation of the number of documents that are similar to a reference document for a set of similarity ratings.

FIG. 3 is a flow diagram of an embodiment of a method 300 for providing a visual representation of the number of documents that are similar to a reference document for a set of similarity ratings. The method 300 is performed by processing logic that may comprise hardware (circuitry, dedicated logic, etc.), software (such as is run on a general purpose computer system or a dedicated machine), or a combination of both. In one embodiment, the method 300 is performed by the server machine 115 of FIG. 1. The method 300 may be performed by a similarity user interface module 110 running on server machine 115 or another machine.

At block 301, processing logic determines a count of the documents in a set of collected data that are similar to a reference document for a set of similarity ratings. Each similarity rating is based on a number of co-occurring terms between the reference document and corresponding similar documents. In one embodiment, processing logic determines the number of documents that are similar to a reference document for all of the similarity ratings that are computed. In one embodiment, processing logic determines the number of documents that are similar to a reference document for a subset of similarity ratings. For example, for each similarity rating in range of 10-95, processing logic determines the number of documents that have the corresponding similarity rating. One embodiment of determining the number of documents that are similar is described in greater detail below in conjunction with FIG. 6.

Figure 4:
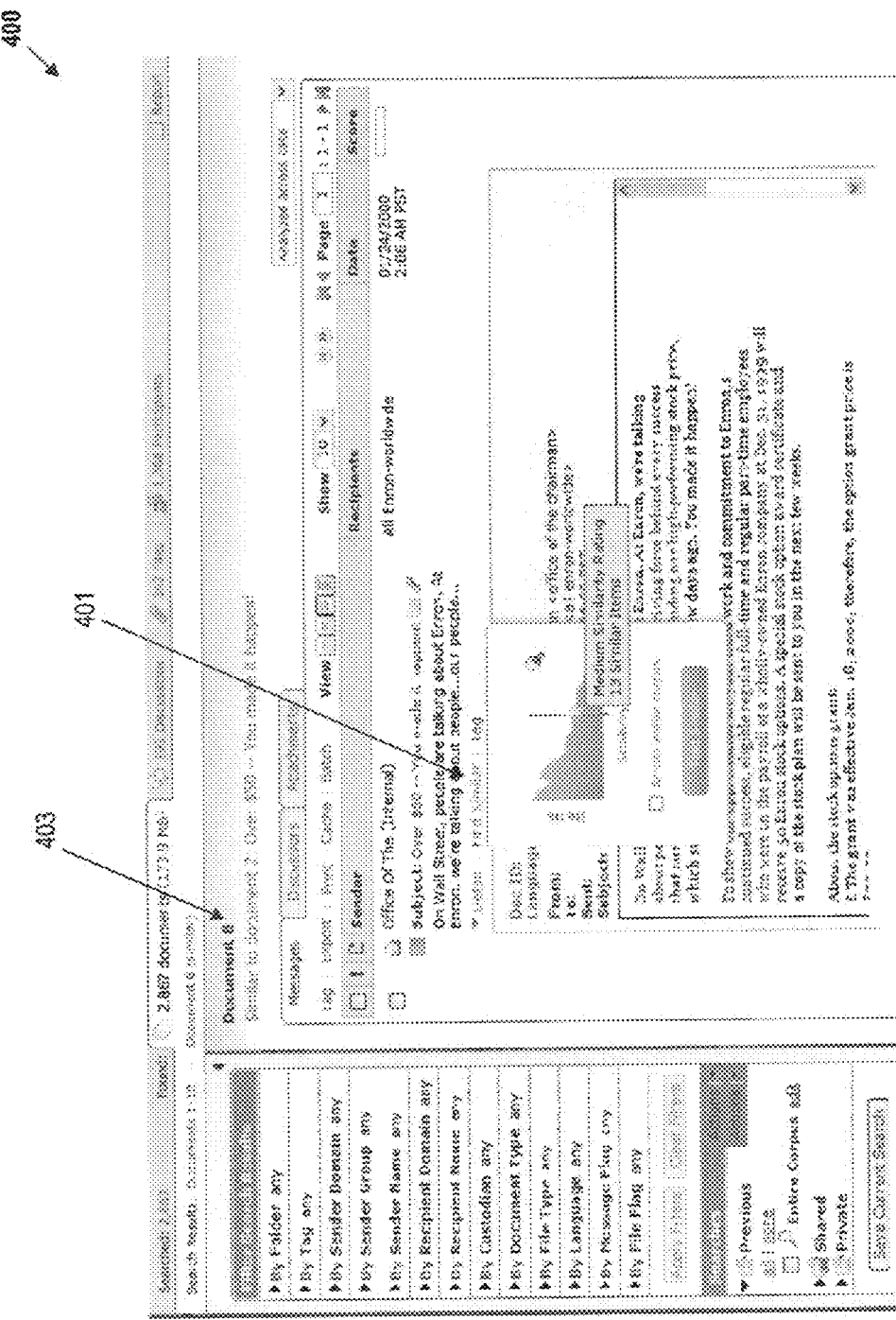
FIG. 4 is an exemplary graphical user interface (GUI) presenting a reference document and a GUI element pertaining to documents that are similar to the reference document.

At block 303, processing logic presents, in a GUI, the reference document and a GUI element pertaining to the documents that are similar to the reference document. FIG. 4 is one embodiment GUI 400 to identify a reference document. GUI 400 can include the GUI element, such as "Find Similar" link 401 that is associated with a particular document, such as Document 8 (403), for finding documents that are similar to the reference document. A user may click the Find Similar GUI element (e.g., link or button) 401 and processing logic can identify the corresponding document, Document 8 (403) as the reference document.

Returning to FIG. 3, at block 305, upon selection of the GUI element (e.g., GUI element 401 in FIG. 4), processing logic presents, in the GUI, a visual representation (e.g., cumulative histogram, standard histogram) of a correlation between the counts of the similar documents and the similarity ratings. Processing logic can present the visual representation in the GUI prior to retrieving any of the similar documents. In one embodiment, the visual representation is presented in a pop-up window. In one embodiment, the GUI is configured with a default similarity rating threshold and visual indicators (e.g., number, sliding bar, text box, etc.) for the default similarity rating threshold. One embodiment of a GUI that provides the visual representation to a user prior to retrieving any of the similar documents is described in greater detail below in conjunction with FIG. 5. At block 307, processing logic receives user input via the GUI of a user-specified similarity rating threshold and updates visual indicators in the GUI to represent the similar documents that have a similarity rating that matches the user-specified similarity rating threshold at block 309. At block 311, processing logic receives user input via the GUI to retrieve the similar documents based on the user-specified or default similarity rating threshold and provides the similar documents to the user at block 313.

Figure 5:
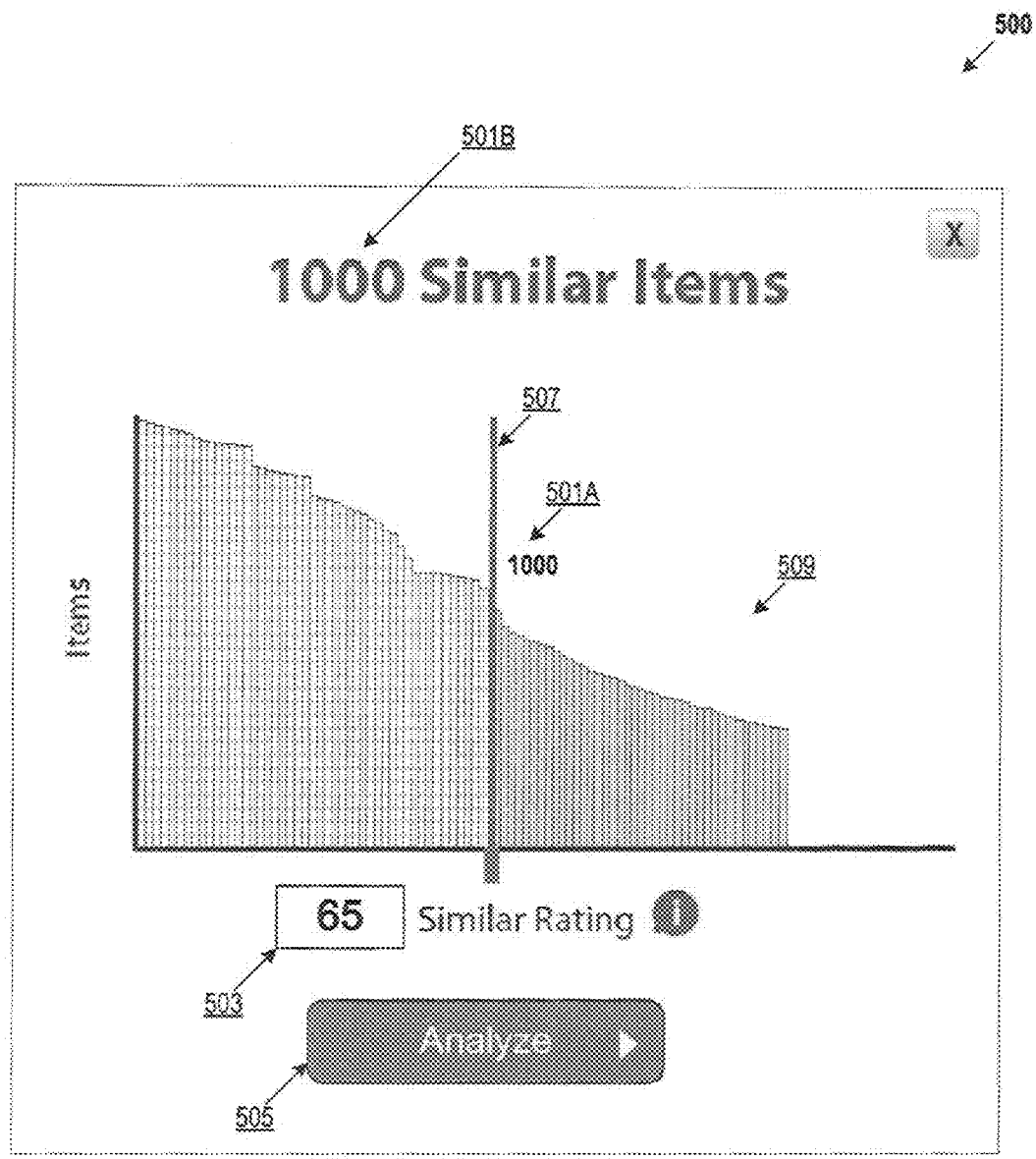
FIG. 5 is an exemplary visual representation of the counts of the similar documents for a set of similarity ratings.

FIG. 5 is an exemplary GUI 500 including a visual representation of the counts of the similar documents for the set of similarity ratings. GUI 500 includes a histogram 509 as the visual representation of the counts of the similar documents for the set of similarity ratings. GUI 500 is configured with a default similarity rating threshold of 65 and initially presents visual indicators that correspond to the default similarity rating threshold 65. For example, GUI 500 presents at least one user interface element 503,507 to visually indicate a default similarity rating threshold of 65. Examples of a user interface element to visually indicate a default similarity rating threshold can include, and are not limited to, bar, a sliding bar, a line, a box, a color, a pattern, a text box, etc. For example, user interface element 507 is a sliding bar positioned in the histogram, user interface element 503 is a text box, and numbers 501A,B represents the count of documents that have a similarity rating that matches the default similarity rating threshold.

GUI 500 includes at least one user interface element 503, 507 to receive user input to specify a user-specified similarity rating threshold. Examples of a user interface element to receive user input to specify a user-specified similarity rating threshold can include, and are not limited to, a sliding bar, a text box, a selection button, a drop down box, etc. For example, a user can enter 20 in user interface 503 to change the similarity rating threshold. In another example, a user can slide user interface element 507 to a position that corresponds to 20. GUI 500 includes a user interface element 505, such as a button which a user can click, to receive the user input triggering processing logic to retrieve the similar documents. Examples of a user interface element to retrieve similar documents can include, and are not limited to, a button, a selection box, a drop down box, etc.

In one embodiment, GUI 500 is presented to a document reviewer during e-discovery, for example, in response to a user selecting a Find Similar element (e.g., Find Similar element 401 in FIG. 4) associated with a reference document. A user can view the data in GUI 500 to determine which similarity rating threshold to specify. For instance, the user may see the sliding bar 507 represents a similarity threshold of 65. The data to the left of the sliding bar 507 can represent the counts for similarity thresholds that are less than 65 and the data to the right of the sliding bar 507 can represent the counts for similarity thresholds that are greater than 65. A user may see from the GUI 500 that there are 1000 documents that have a similarity rating of 65 and above, there are more documents that have a similarity rating that are less than 65, and there are less documents that a similarity rating greater than 65. For example, the user can slide the sliding bar 507 to the left to a position that corresponds to a similarity rating of 20 and the GUI 500 visual indicators 501A,B may show that there are 1500 documents that have a similarity rating of 20 and above. Based on the histogram data, the user may decide that the number of documents for a similarity rating of 20 and above is appropriate and may wish to retrieve documents that have a similarity rating of 20 and above. A user may click on a user interface element in the GUI to find documents that are similar to the reference document based a similarity rating of 20 and above. The computing device may then run a search, which will return those documents which are considered similar based on the user-specified similarity rating.

Figure 6:
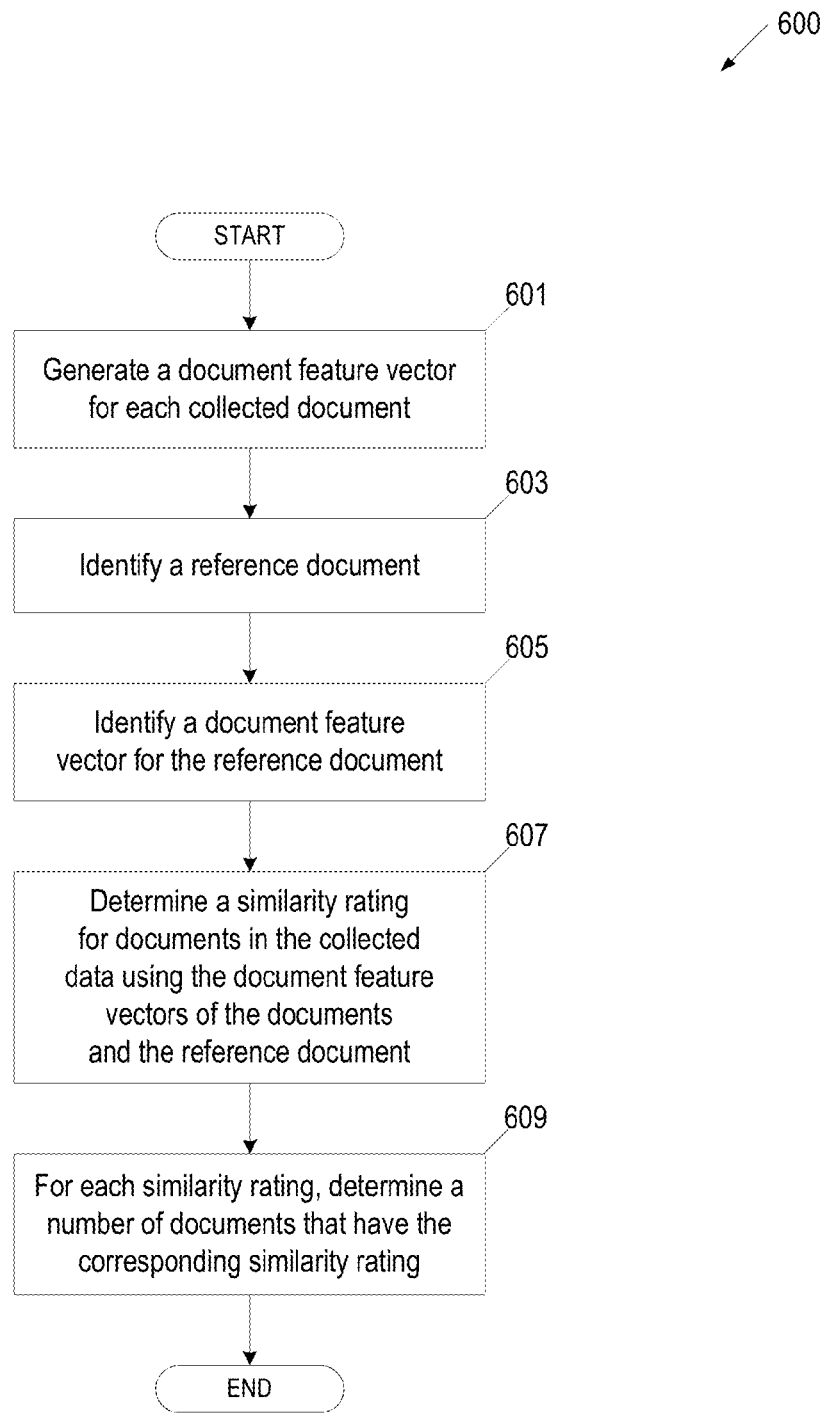
FIG. 6 is a flow diagram illustrating an embodiment for a method of determining document similarity based on a reference document for a set of similarity ratings.

FIG. 6 is a flow diagram of an embodiment of a method 600 for determining document similarity based on a reference document for a set of similarity ratings. The method 600 is performed by processing logic that may comprise hardware (circuitry, dedicated logic, etc.), software (such as is run on a general purpose computer system or a dedicated machine), or a combination of both. In one embodiment, the method 600 is performed by the server machine 115 of FIG. 1. The method 600 may be performed by a similarity user interface module 110 running on server machine 115 or another machine.

Figure 7:
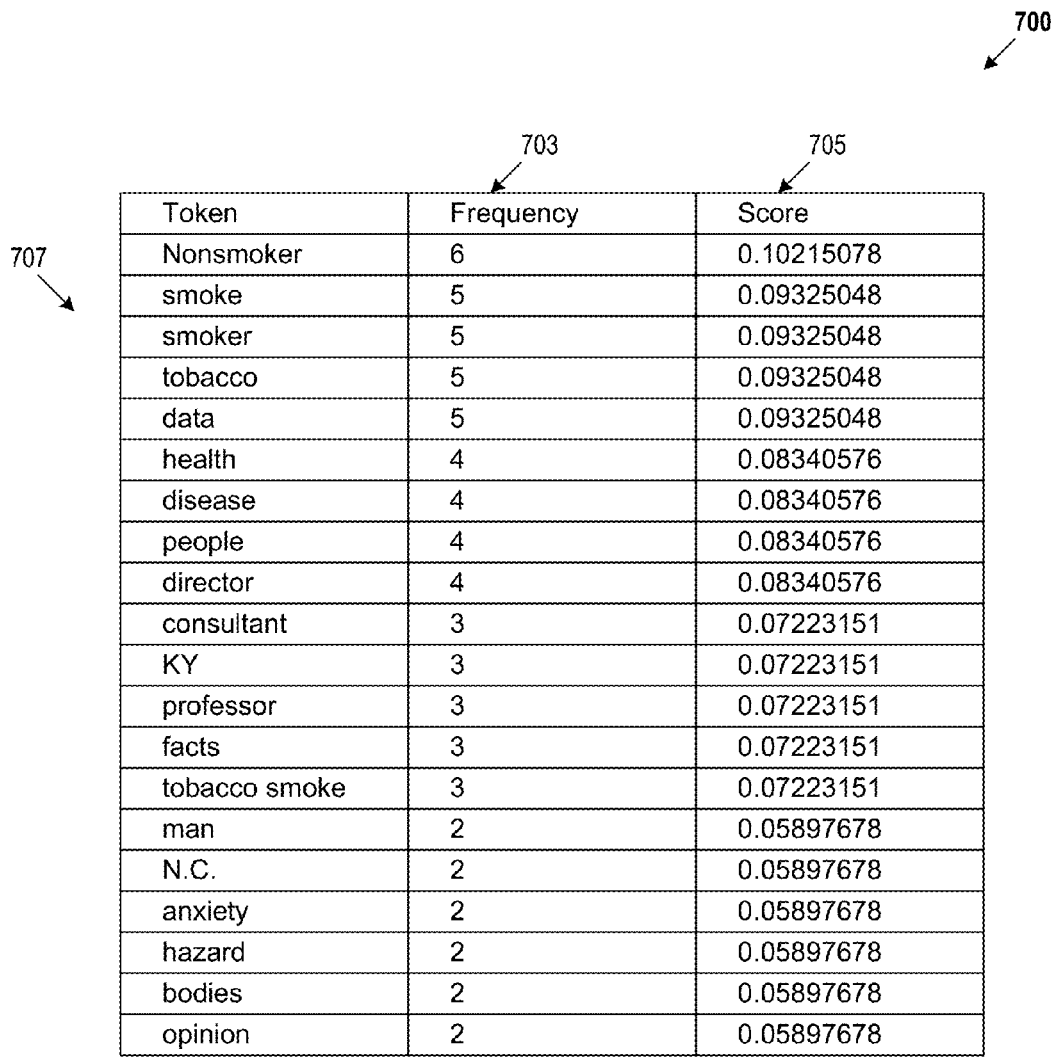
FIG. 7 is an exemplary document feature vector.

At block 601, processing logic generates a document feature vector for each collected document. Processing logic can extract properties of a document from a document. An example of a document property can include, and is not limited to, noun phrases. A noun phrase is hereinafter also referred to as a term. Processing logic can identify the noun phrases in a document and determine a count of how frequent the noun phrase occurs in the document. Processing logic can apply weights to the count to determine a document term-score for each noun phrase. Noun phrases in regions of a document, such as "Subject" of an email message, may have a higher weight. In one embodiment, processing logic includes the document term-score for each noun phrase in the document feature vector. In one embodiment, processing logic computes a document feature vector that represents 20 terms having the highest frequency along with the corresponding document term-score. In another embodiment, a document feature vector is limited to 100 noun phrases. Processing logic can store the document feature vectors in a data store that is coupled to the similarity user interface module. FIG. 7 is an exemplary document feature vector 700 for a document. The document feature vector 700 includes 20 terms 707 having the highest frequency 703 along with the corresponding document term-score 705.

Returning to FIG. 6, at block 603, processing logic identifies a reference document. In one example processing logic receives user input via a graphical user interface indicating a reference document. For example, a user may click a Find Similar GUI element. At block 605 processing logic identifies a document feature vector for the reference document. Processing logic can search the data store to locate the document feature vector for the reference document using an identifier of the reference document. If a document feature vector is not in the data store, processing logic can compute a document feature vector for the reference document.

At block 607, processing logic determines a similarity rating for documents in the collected data in the data store by comparing the document feature vector of the reference document to the document feature vectors of the documents in the collected data. Processing logic can make the comparison to determine the similarity rating, using a distance measurement, such as a cosine distance, a log-linear similarity measurement, etc. The cosine distance can reflect a normalized correlation coefficient between two documents, and measures the number of terms that co-occur. The distance measurement is a way to determine the similarity rating for a document to describe how aligned a reference document's feature vector is relative to another document's feature vector. In one embodiment, processing logic maps a distance measurement for a document to a number within a range to be used as the similarity rating. In one embodiment, the range is 0-100. In another embodiment, the range is 0-1. In one embodiment, a similarity rating that is high in a range (e.g., 100, 1) indicates that the document feature vector of a document completely matches the reference document's feature vector. In one embodiment, a similarity rating that is low in a range (e.g., 0) indicates that the document feature vector of a document does not match the reference document's feature vector at all. At block 609, for each similarity rating in a range (e.g., 0-100), processing logic determines the number of documents that have the corresponding similarity rating. Processing logic can store the counts in the data store and subsequently generate a visual representation (e.g., histogram) using the counts.

Figure 8:
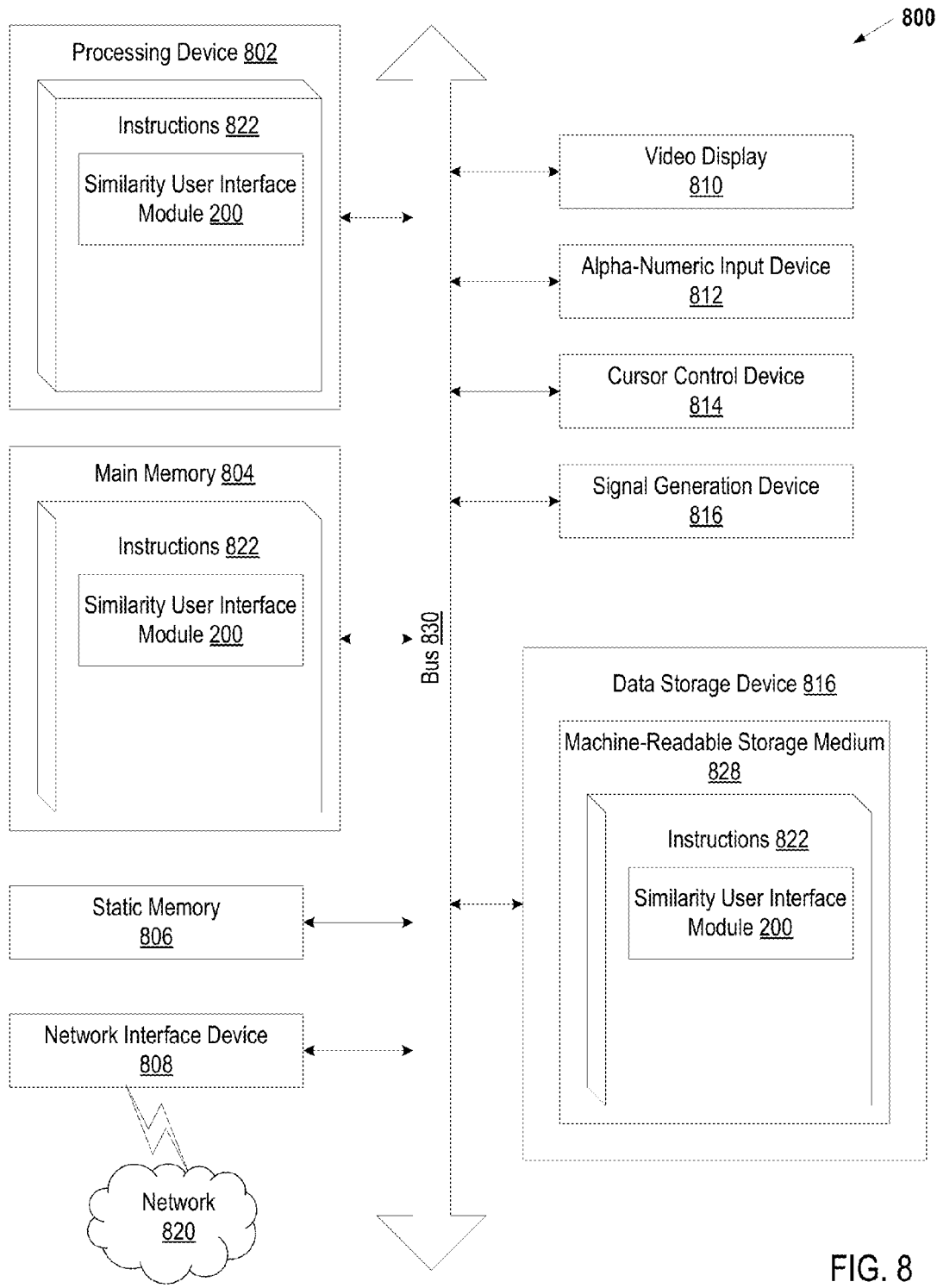
FIG. 8 is a block diagram of an exemplary computer system that may perform one or more of the operations described herein.

FIG. 8 illustrates a diagram of a machine in the exemplary form of a computer system 800 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 800 includes a processing device (processor) 802, a main memory 804 (e.g., read-only memory (ROM), flash memory, dynamic random access memory (DRAM) such as synchronous DRAM (SDRAM), double data rate (DDR SDRAM), or DRAM (RDRAM), etc.), a static memory 806 (e.g., flash memory, static random access memory (SRAM), etc.), and a data storage device 818, which communicate with each other via a bus 830.

Processor 802 represents one or more general-purpose processing devices such as a microprocessor, central processing unit, or the like. More particularly, the processor 802 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 802 may also be one or more special-purpose processing devices such as an application specific integrated circuit (ASIC), a field programmable gate array (FPGA), a digital signal processor (DSP), network processor, or the like. The processor 802 is configured to execute instructions 822 for performing the operations and steps discussed herein.

The computer system 800 may further include a network interface device 808. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 816 (e.g., a speaker).

The data storage device 818 may include a computer-readable storage medium 828 on which is stored one or more sets of instructions 822 (e.g., software) embodying any one or more of the methodologies or functions described herein. The instructions 822 may also reside, completely or at least partially, within the main memory 804 and/or within the processor 802 during execution thereof by the computer system 800, the main memory 804 and the processor 802 also constituting computer-readable storage media. The instructions 822 may further be transmitted or received over a network 820 via the network interface device 808.

In one embodiment, the instructions 822 include instructions for a similarity user interface module (e.g., similarity user interface module 200 of FIG. 2) and/or a software library containing methods that call a similarity user interface module. While the computer-readable storage medium 828 (machine-readable storage medium) is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present invention may be practiced without these specific details. In some instances, well-known structures and devices are shown in block diagram form, rather than in detail, in order to avoid obscuring the present invention.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "determining", "generating", "providing", "presenting", "receiving," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present invention also relates to an apparatus for performing the operations herein. This apparatus may be constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   determining, by a processing device, counts of documents similar to a reference document for a plurality of similarity ratings, each similarity rating being based on a number of co-occurring terms between the reference document and corresponding similar documents;
   presenting in a graphical user interface (GUI) the reference document and a GUI element pertaining to the documents similar to the reference document; and
   upon a selection of the GUI element, presenting in the GUI a second GUI element comprising the similarity ratings associated with the reference document; and
   in response to selecting one of the similarity ratings, presenting in the second GUI element a visual representation of the counts of similar documents that indicate a number of documents that are retrievable based on the selected similarity rating, wherein the visual representation is provided prior to retrieving one of the similar documents.

2. The method of claim 1, wherein the GUI further comprises:
   a third GUI element to receive input of a user-specified similarity rating threshold, the user-specified similarity rating threshold being used to display at least one of the similar documents.

3. The method of claim 1, further comprising:
   presenting in the GUI a number representing the similar documents having a similarity rating matching a default similarity rating threshold.

4. The method of claim 1, further comprising:
   receiving input via the GUI of a user-specified similarity rating threshold; and
   presenting in the GUI a number representing the similar documents having a similarity rating matching the user-specified similarity rating threshold.

5. The method of claim 1, further comprising:
   receiving user input via the GUI to retrieve similar documents having a similarity rating matching a similarity rating threshold, wherein the similarity rating threshold is at least one of a default similarity rating threshold and a user-specified similarity rating threshold; and
   displaying the similar documents having a similarity rating matching the similarity rating threshold.

6. The method of claim 1, wherein the visual representation is a histogram of the counts of the similar documents for the plurality of similarity ratings.

7. The method of claim 6, wherein the histogram is a cumulative histogram.

8. The method of claim 1, wherein determining the counts of the similar documents comprises:
   determining a similarity rating for documents in collected data by comparing a document feature vector of the reference document to a document feature vector of the documents in the collected data; and
   for each similarity rating, determining a number of documents having the corresponding similarity rating.

9. A system comprising:
   a memory; and
   a processing device coupled with the memory to:
      determine counts of documents similar to a reference document for a plurality of similarity ratings, each similarity rating being based on a number of co-occurring terms between the reference document and corresponding similar documents;
      present in a graphical user interface (GUI) the reference document and a GUI element pertaining to the documents similar to the reference document; and
      upon a selection of the GUI element, present in the GUI second GUI element comprising similarity ratings associated with the reference document; and
      in response to selecting one of the similarity ratings, present in the second GUI element a visual representation of the counts of similar documents that indicate a number of documents that are retrievable based on the selected similarity rating, wherein the visual representation is provided prior to retrieving one of the similar documents.

10. The system of claim 9, wherein the GUI further comprises:
    a third GUI element to receive input of a user-specified similarity rating threshold, the user-specified similarity rating threshold being used to display at least one of the similar documents.

11. The system of claim 9, wherein the processing device is further to:
    present in the GUI a number representing the similar documents having a similarity rating matching a default similarity rating threshold.

12. The system of claim 9, wherein the processing device is further to:
    receive input via the GUI of a user-specified similarity rating threshold; and
    present in the GUI a number representing the similar documents having a similarity rating matching the user-specified similarity rating threshold.

13. The system of claim 9, wherein the processing device is further to:
    receive user input via the GUI to retrieve similar documents having a similarity rating matching a similarity rating threshold, wherein the similarity rating threshold is at least one of a default similarity rating threshold and a user-specified similarity rating threshold; and
    display the similar documents having a similarity rating matching the similarity rating threshold.

14. The system of claim 9, wherein the visual representation is a histogram of the counts of the similar documents for the plurality of similarity ratings.

15. The system of claim 14, wherein the histogram is a cumulative histogram.

16. The system of claim 9, wherein the processing device is to determine the counts of the similar documents by:
    determining a similarity rating for documents in collected data by comparing a document feature vector of the reference document to a document feature vector of the documents in the collected data; and for each similarity rating, determining a number of documents having the corresponding similarity rating.

17. A non-transitory computer readable storage medium including instructions that, when executed by a processor, cause the processor to perform operations comprising:

determining, by the processor, counts of documents similar to a reference document for a plurality of similarity ratings, each similarity rating being based on a number of co-occurring terms between the reference document and corresponding similar documents;

presenting in a graphical user interface (GUI) the reference document and a GUI element pertaining to the documents similar to the reference document; and upon a selection of the GUI element, presenting in the GUI a second GUI element comprising similarity ratings associated with the reference document; and in response to selecting one of the similarity ratings, presenting in the second GUI element a visual representation of the counts of similar documents that indicate a number of documents that are retrievable based on the selected similarity rating, wherein the visual representation is provided prior to retrieving one of the similar documents.

18. The non-transitory computer readable storage medium of claim 17, wherein the GUI further comprises:

a third GUI element to receive input of a user-specified similarity rating threshold, the user-specified similarity rating threshold being used to display at least one of the similar documents.

19. The non-transitory computer readable storage medium of claim 18, the operations further comprising:

receiving input via the GUI of a user-specified similarity rating threshold; and presenting in the GUI a number representing the similar documents having a similarity rating matching the user-specified similarity rating threshold.

20. The non-transitory computer readable storage medium of claim 17, wherein the visual representation is a histogram of the counts of the similar documents for the plurality of similarity ratings.

* * * * *